United States Patent
Oshita

(10) Patent No.: US 9,405,276 B2
(45) Date of Patent: Aug. 2, 2016

(54) RADIO CONTROLLED TIMEPIECE

(71) Applicant: CASIO COMPUTER CO., LTD., Shibuya-ku, Tokyo (JP)

(72) Inventor: Yuki Oshita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/830,498

(22) Filed: Aug. 19, 2015

(65) Prior Publication Data

US 2016/0070240 A1    Mar. 10, 2016

(30) Foreign Application Priority Data

Sep. 5, 2014  (JP) ................. 2014-181024

(51) Int. Cl.
| | |
|---|---|
| *G04R 20/04* | (2013.01) |
| *G04R 20/06* | (2013.01) |
| *G01S 19/14* | (2010.01) |
| *G01S 19/24* | (2010.01) |

(52) U.S. Cl.
CPC ............. *G04R 20/06* (2013.01); *G01S 19/14* (2013.01); *G01S 19/24* (2013.01); *G04R 20/04* (2013.01)

(58) Field of Classification Search
CPC ........ G04R 20/00; G04R 20/02; G04R 20/04; G04R 20/06
See application file for complete search history.

(56) References Cited

U.S. PATENT DOCUMENTS

| | | | |
|---|---|---|---|
| 8,169,857 B2 | 5/2012 | Matsuzaki | |
| 8,437,227 B2 | 5/2013 | Matsuzaki | |
| 2003/0198140 A1* | 10/2003 | Shimizu | G04G 3/02 368/47 |
| 2004/0202051 A1* | 10/2004 | Ihara | G04G 5/002 368/47 |
| 2009/0015470 A1* | 1/2009 | Fujisawa | G01S 19/235 342/357.62 |
| 2010/0054087 A1* | 3/2010 | Matsuzaki | G04R 20/04 368/14 |
| 2013/0051188 A1* | 2/2013 | Akiyama | G04R 20/04 368/47 |

FOREIGN PATENT DOCUMENTS

JP         2010060456 A      3/2010

* cited by examiner

Primary Examiner — Vit W Miska
(74) Attorney, Agent, or Firm — Holtz, Holtz & Volek PC

(57) ABSTRACT

A radio controlled timepiece includes a GPS reception processing unit that searches for and captures a signal included in radio waves from a positioning satellite, demodulates and decodes the captured signal to acquire the data corresponding to acquisition target information in data transmitted from the positioning satellite, acquires the acquisition target information using the acquired data, holds a failure history related to acquisition of the data with respect to each captured signal, suspends acquisition of the data from a signal having a reception level determined to be at least equal to a predetermined reference level based on the failure history, and ends acquisition of the data when the number of signals from which the data is to be acquired after search for the signal is ended under a predetermined condition becomes smaller than the number of signals necessary in acquiring the acquisition target information.

20 Claims, 7 Drawing Sheets

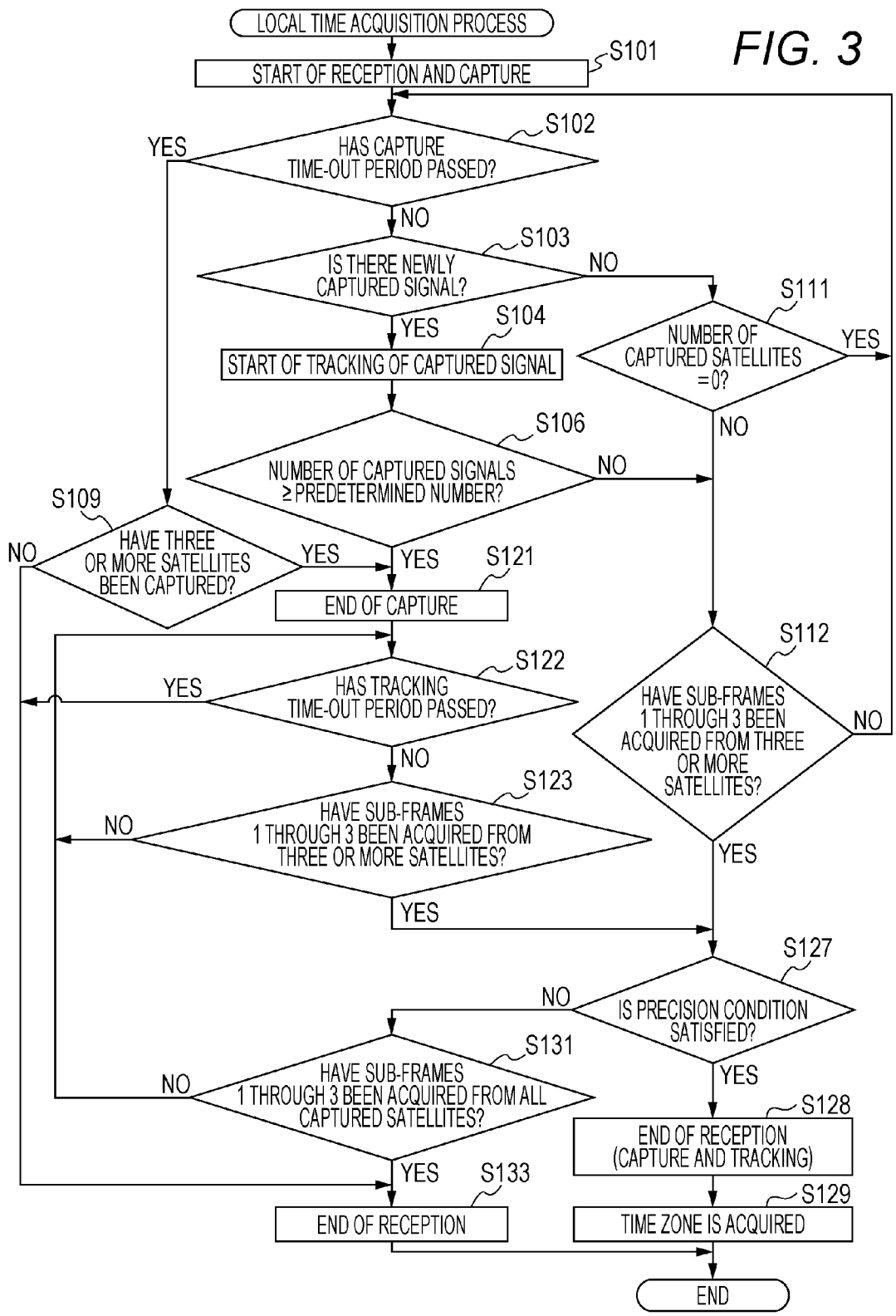

RADIO CONTROLLED TIMEPIECE

BACKGROUND OF THE INVENTION

The present invention relates to a radio controlled timepiece that acquires information by receiving radio waves from positioning satellites.

There have been electronic clocks (radio controlled timepieces) that receive radio waves containing date and time information and location information, and perform date and time correction, time zone setting, and the like. Performing such operations in accordance with movement of a user, a lapse of a predetermined time, and the like, a radio controlled timepiece readily and accurately counts the date and time, and can display the local time in accordance with the current location of the user.

There are positioning satellites according to GNSS (Global Navigation Satellite System) as one type of information source that radio-transmits date and time information and location information from outside by radio. Radio waves from positioning satellites can be received anywhere in the world as long as the sky is visible. Accordingly, there are only a few restrictions on such radio waves, and such radio waves are preferably used in portable radio controlled timepieces.

Meanwhile, to receive radio waves from positioning satellites, a much larger load is normally required, compared with the electrical load necessary in a counting operation or a display operation to be performed in an electronic clock. In a portable radio controlled timepiece, or particularly a wristwatch, a power supply that readily copes with a large load cannot be used, as the small size and the light weight need to be maintained. In view of this, technologies have been developed for reducing power consumption by shortening the time required to receive radio waves from a positioning satellite in various manners.

However, if an upper limit is set on reception periods, the possibility that information can be successfully acquired becomes lower. In view of this, JP 2010-60456 A discloses a technology by which the reception-restricted time is varied depending on the intensity of reception from a positioning satellite, and any extension of the reception-restricted time is not allowed when the remaining battery level is low.

Even when the reception level is high, information is not necessarily acquired successfully in a short time, due to temporary noise or the like. When the reception level is low, on the other hand, even if information is successfully acquired, its precision might be too low and cause a problem in practical use. In such cases, there are only low possibilities that information can be successfully acquired in spite of long reception periods, and failed information acquisition is likely to consume electric power for nothing.

The present invention relates to a radio controlled timepiece that can efficiently acquire information from positioning satellites.

SUMMARY OF THE INVENTION

To achieve the above object, the present invention provides a radio controlled timepiece that receives radio waves transmitted from a positioning satellite, and includes
a GPS reception processing unit configured to
search for and capture a signal from a positioning satellite, the signal being included in received radio waves,
demodulate and decode the captured signal, to acquire the data corresponding to acquisition target information in data transmitted from the positioning satellite,
acquire the acquisition target information, using the acquired data,
hold a failure history related to acquisition of the data with respect to each captured signal,
suspend acquisition of the data from a signal having a reception level determined to be at least equal to a predetermined reference level based on the failure history, and
end acquisition of the data when the number of signals from which the data is to be acquired after search for the signal is ended under a predetermined condition becomes smaller than the number of signals necessary in acquiring the acquisition target information.

BRIEF DESCRIPTION OF THE DRAWINGS

FIG. 3 is a flowchart showing the control procedures in a local time acquisition process to be performed by the GPS reception processing unit of an electronic clock according to a first embodiment;

DETAILED DESCRIPTION

The following is a description of embodiments of the present invention, with reference to the accompanying drawings.

Figure 1:
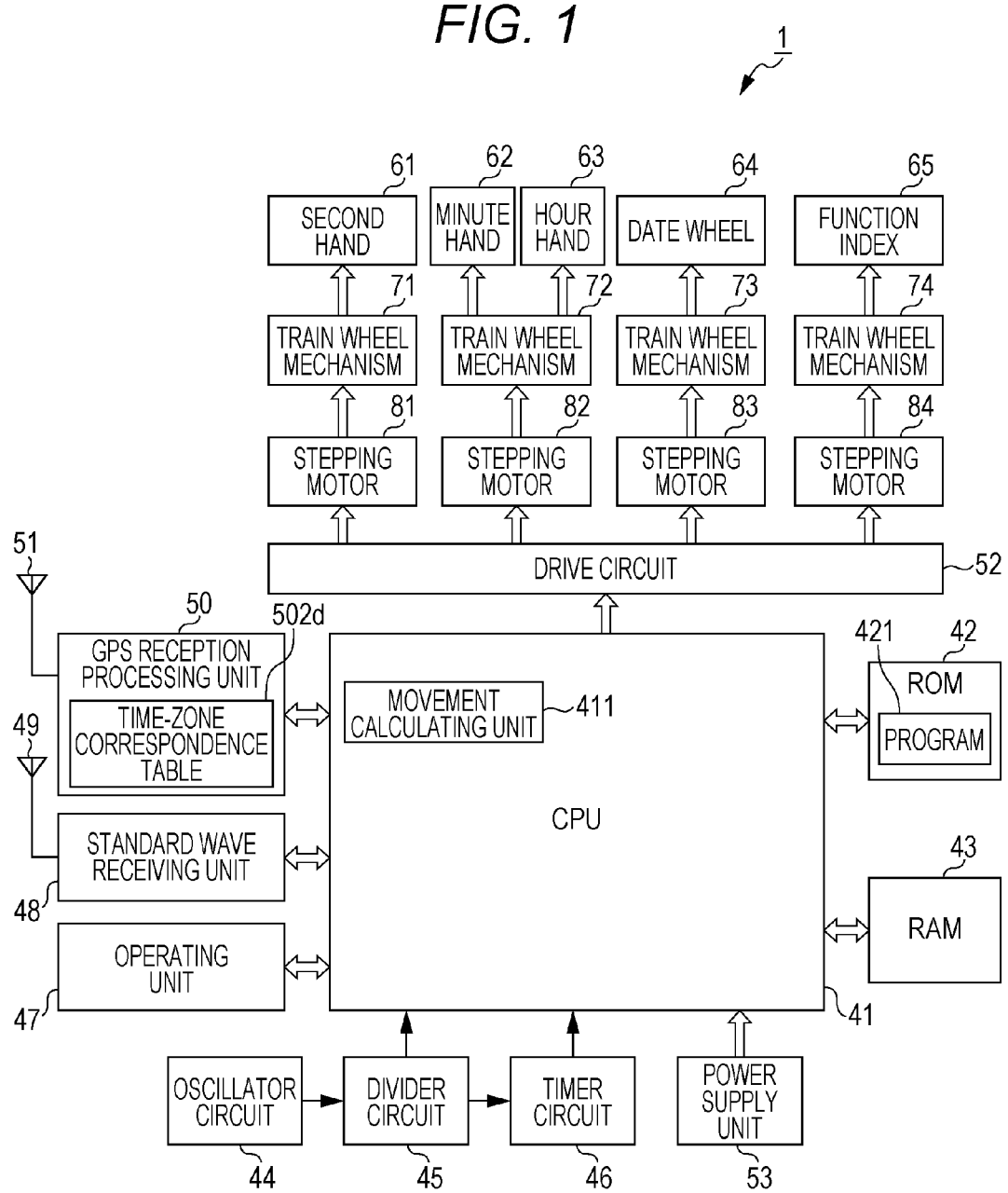
FIG. 1 is a block diagram showing the functional structure of an electronic clock according to an embodiment of the present invention.

FIG. 1 is a block diagram showing the functional structure of an electronic clock 1 according to an embodiment of the present invention.

This electronic clock 1 is a radio controlled timepiece that can be used when receiving radio waves from positioning satellites.

The electronic clock 1 according to a first embodiment includes a CPU 41 (Central Processing Unit) (the clock control unit), a ROM 42 (Read Only Memory), a RAM 43 (Random Access Memory), an oscillator circuit 44, a divider circuit 45, a timer circuit 46, an operating unit 47, a standard wave receiving unit 48 and its antenna 49, a GPS reception processing unit 50 and its antenna 51, a drive circuit 52, a power supply unit 53, a second hand 61, a minute hand 62, an hour hand 63, a date wheel 64, a function index 65, train wheel mechanisms 71 through 74, and stepping motors 81 through 84. Hereinafter, some or all of the second hand 61, the minute hand 62, the hour hand 63, the date wheel 64, and the function index 65 will also be collectively referred to as indexes 61 through 65.

The CPU 41 performs various kinds of arithmetic processing, and controls entire operation of the electronic clock 1 in an integrated manner. The CPU 41 controls index operation related to display of a date and time, and calculates the date and time by operating the standard wave receiving unit 48 and acquiring received data. Based on the acquired date and time data, the CPU 41 corrects the date and time counted by the timer circuit 46.

The ROM 42 stores a program 421 for various kinds of control to be performed by the CPU 41, and setting data. The program 421 includes a program related to operation control in various functional modes, for example.

The RAM 43 provides the CPU 41 with a work memory space, and stores temporary data.

The oscillator circuit 44 generates and outputs a predetermined frequency signal. The oscillator circuit 44 includes a crystal oscillator, for example.

The divider circuit 45 divides the frequency signal output from the oscillator circuit 44 into signals at frequencies to be used by the CPU 41 and the timer circuit 46, and outputs the signals. The frequencies to be output may be changeable in accordance with a control signal from the CPU 41.

The timer circuit 46 counts the current date and time by adding a divided signal input from the divider circuit 45 to an initial value indicating a predetermined date and time. The date and time counted by the timer circuit 46 can be corrected in accordance with a control signal from the CPU 41.

The operating unit 47 accepts an input operation from a user. The operating unit 47 includes push-button switches and a rotary switch. When one of the push-button switches is pressed or released, or when the rotary switch is pulled out and rotated or is pushed back, an electrical signal indicating the corresponding operation is output as an interrupt signal to the CPU 41.

The standard wave receiving unit 48 receives radio waves (standard waves) in a long-wavelength band using the antenna 49, demodulates the amplitude-modulated time signal output (TCO) of the standard waves, and outputs the time signal to the CPU 41. The tuning frequency in the long-wavelength band according to the standard wave receiving unit 48 is changed depending on a transmission frequency from a station that transmits the standard waves to be received under the control of the CPU 41. The standard wave receiving unit 48 also performs various kinds of processing for increasing receiving sensitivity, digitizes an analog signal at a predetermined sampling frequency, and outputs the digitized signal to the CPU 41.

Using the antenna 51, the GPS reception processing unit 50 receives radio waves in the L1 band (1.57542 GHz) being transmitted from a positioning satellite, and demodulates and decodes a signal (navigation message) from the positioning satellite, to acquire date and time information and location information. The acquired information is output, to the CPU 41, in a format that is set in accordance with the NMEA (National Marine Electronics Associations)-0182 standards or the like. The GPS reception processing unit 50 receives, from the CPU 41, the information to be acquired and the settings related to the output format, and stores the information and the settings. The GPS reception processing unit 50 also stores predicted orbit information that is acquired from a positioning satellite and is about the positioning satellite, and can read and use the predicted orbit information as necessary at a time of reception. A time-zone correspondence table 502*d* for acquiring the time zone corresponding to a designated location or daylight-saving-time information is also stored in the GPS reception processing unit 50.

The drive circuit 52 receives a control signal from the CPU 41, outputs a drive signal to the corresponding one of the stepping motors 81 through 84 at an appropriate time in accordance with the control signal, and rotatively drives the corresponding one of the stepping motors 81 through 84. Based on the settings input from the CPU 41, the drive circuit 52 can adjust the pulse width of the drive signal and the drive voltage as appropriate. In a case where a control signal for simultaneously driving more than one stepping motor so as not to apply a high load at once is input, the drive circuit 52 can rotatively drive those stepping motors sequentially at very short intervals so that the stepping motors are not driven in an overlapping manner.

The power supply unit 53 supplies the power for operations of the respective components at a predetermined voltage. The power supply unit 53 includes a battery, and this battery may be an exchangeable button-type dry-cell battery, for example. Alternatively, a solar panel and a secondary cell may be used as the battery. In a case where different voltages are output from the power supply unit 53, the voltages can be converted into a desired voltage by a switching power supply, for example, and be then output.

The stepping motor 81 rotatively moves the second hand 61 via the train wheel mechanism 71 that is an array of gear wheels. When the stepping motor 81 is driven once, the second hand 61 rotates six degrees in one step. While the stepping motor 81 is driven 60 times, the second hand 61 comes full circle on the clock face.

The stepping motor 82 rotatively moves the minute hand 62 and the hour hand 63 via the train wheel mechanism 72. The train wheel mechanism 72 is designed to rotate the hour hand 63 in conjunction with the minute hand 62, and rotates the hour hand 63 one-twelfth of a degree while rotating the minute hand 62 one degree.

The stepping motor 83 rotatively moves the date wheel 64 via the train wheel mechanism 73. The date wheel 64 is provided at a lower portion of the clock face for displaying the indexes (or on the back side) of the electronic clock 1, and can rotate parallel to the clock face for displaying the indexes, though not particularly limited. While an opening is formed in the clock face, respective indicators that indicate the first through 31st days are provided on the circumference of the date wheel 64 facing the opening, and one of the indicators is exposed through the opening as the date wheel 64 rotatively moves. When the stepping motor 83 is driven once, the date wheel 64 rotatively moves the degrees equivalent to one step. While the stepping motor 83 rotatively moves 150 steps, the date wheel 64 rotatively moves 360/31 degrees, so that the date indicator exposed through the opening of the clock face changes by one day. When the date wheel 64 completes rotating by the amount equivalent to 31 days, the date indicator indicating the first day is again exposed through the opening.

The stepping motor 84 rotatively moves the function index 65 via the train wheel mechanism 74. The function index 65 rotates about a different rotation axis from any of the second hand 61, the minute hand 62, the hour hand 63, and the date wheel 64, for example, and is used for displaying contents other than date display or displaying the type of the contents. The train wheel mechanism 74 rotates the function index 65 six degrees, as the stepping motor 84 revolves once, for example.

Next, radio wave reception by the GPS reception processing unit 50 from positioning satellites is described.

Figure 2A:
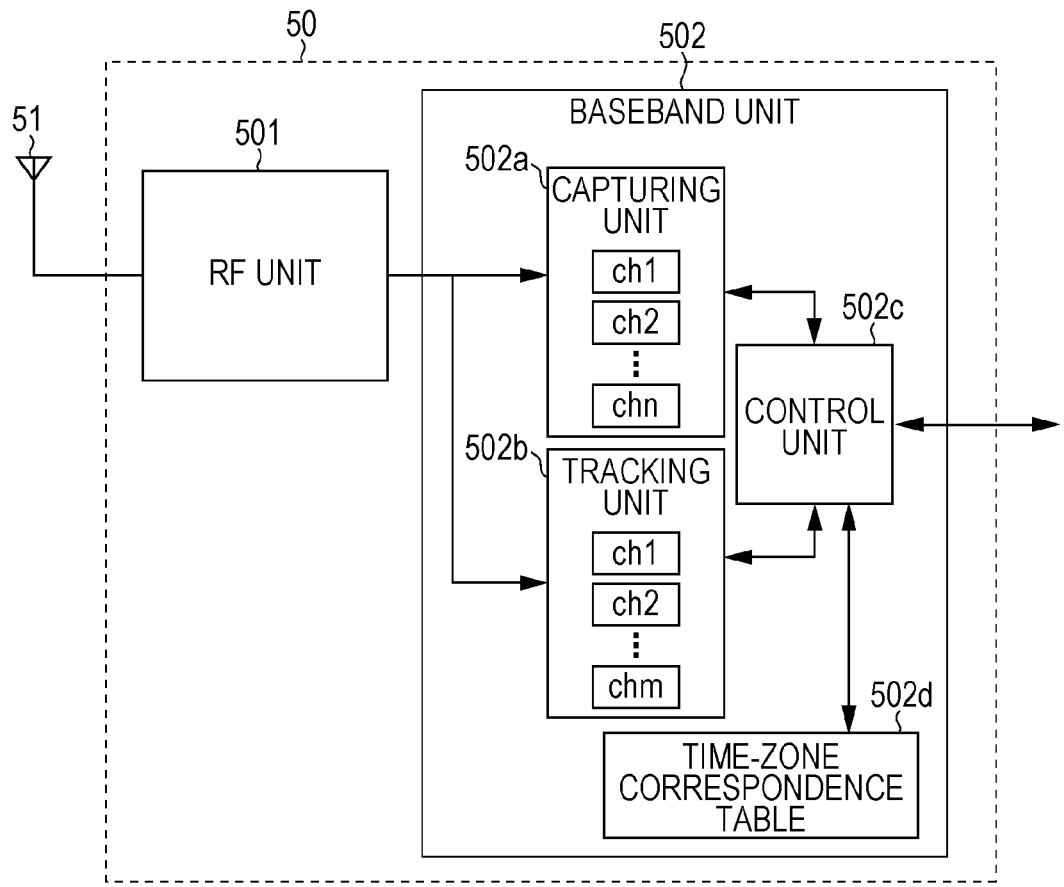
FIG. 2A is a block diagram showing the internal structure of a GPS reception processing unit.

FIG. 2A is a block diagram showing the internal structure of the GPS reception processing unit 50.

Figure 2B:
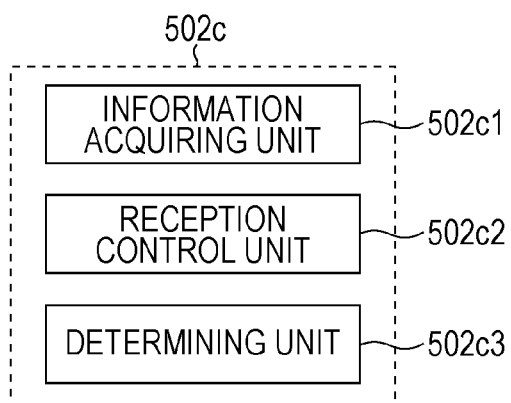
FIG. 2B is a block diagram showing the internal structure of a control unit of the GPS reception processing unit.

FIG. 2B is a block diagram showing the internal structure of a control unit 502*c* of the GPS reception processing unit 50.

The GPS reception processing unit 50 includes an RF (Radio Frequency) unit 501 connected to the antenna 51, and a baseband unit 502 connected to the RF unit 501.

The RF unit 501 amplifies a signal from radio waves received by the antenna 51, and converts the signal into a signal frequency (a baseband). The RF unit 501 includes a LNA (Low Noise Amplifier), a BPF (Band Pass Filter), a local oscillator, a mixer, and an IF (Intermediate Frequency) amplifier, for example, and converts signals into a baseband signal around an intermediate frequency by a superheterodyne system.

The baseband unit 502 searches the signals converted into the baseband signal for signals from respective positioning satellites, and captures the signals. The baseband unit 502 then demodulates and decodes the captured signals, to acquire desired information. The baseband unit 502 includes a capturing unit 502a, a tracking unit 502b, and the control unit 502c (an information acquiring unit 502c1, a reception control unit 502c2, and a determining unit 502c3). The capturing unit 502a inversely spreads a spectrum by sequentially applying respective pseudonoise signals (C/A codes) set for the positioning satellites to be captured to the baseband signal, and calculates correlation values. By doing so, the capturing unit 502a searches for and captures signals from the positioning satellites related to the C/A codes. The tracking unit 502b demodulates and decodes a navigation messages of the positioning satellites by sequentially using the C/A codes of the positioning satellites captured by the capturing unit 502a in identified phases, and acquires the necessary data for acquiring the current location (the information to be acquired), or information about the date and time contained in sub-frames 1 through 3 (including correction information) and predicted orbit information (an ephemeris).

The control unit 502c controls operation of the baseband unit 502. The control unit 502c includes a CPU (module CPU), a RAM, and a storage unit. The module CPU switches on and off operations of the capturing unit 502a and the tracking unit 502b, selects and controls the positioning satellites to be received, and performs setting and control related to data exchange with the CPU 41. The module CPU also calculates (acquires) the current location, using the date and time information and the predicted orbit information acquired by the tracking unit 502b. The RAM is a volatile memory that provides the module CPU with a work memory space. The storage unit stores predicted orbit data (an ephemeris or almanac) acquired from the positioning satellites, and the settings related to the past reception history and the information to be received. The data and the settings are read and used as necessary. The capturing unit 502a can cause search engines (capture processing units) for channels ch1 through chn (n being 16, for example) to search for signals in parallel. The tracking unit 502b can enable demodulation and decoding of signals on channels chi through chm (m being 8, for example) in parallel. In a case where signals from 32 satellites are searched for in parallel, 16 satellites and the other 16 satellites are alternately searched.

The control unit 502c can switch on and off operations of the capturing unit 502a and tracking unit 502b independently of each other. The control unit 502c can also set the positioning satellites related to the signals to be captured by the capturing unit 502a. For example, the control unit 502c can exclude a positioning satellite that has already been captured by the capturing unit 502a and is being tracked by the tracking unit 502b, from the positioning satellites to be captured.

In accordance with a setting as to whether positioning satellites according to GPS and GLONASS are used, or whether only positioning satellites according to one of the positioning systems are used, the control unit 502c can expand the positioning satellites to be captured to both systems or further to Galileo, or can limit the positioning satellites to be captured to one of the systems.

In a case where predicted orbit information is held at a time of location measurement, or where predicted orbit information is acquired during reception, the control unit 502c can exclude, from the positioning satellites to be captured, the positioning satellites related to signals that cannot be received at ground level at the same time as already-captured signals, in accordance with the predicted orbit information. Further, in a case where general location information is stored in advance, signals from the positioning satellites located in such positions that the signals cannot be received may be excluded from the signals to be captured, in accordance with the location information and the current date and time.

Next, a location measuring operation in the electronic clock 1 is described.

Signals from positioning satellites are spectrum-spread with C/A codes unique to the respective positioning satellites, and are radio-transmitted. Therefore, the capturing unit 502a calculates correlation values with respect to the respective C/A codes, and identifies C/A codes having high correlation values and their phases, to capture signals from the positioning satellites corresponding to the C/A codes. The tracking unit 502b demodulates and decodes the captured signals with the C/A codes used in the capture and in the phases. This process is continued.

In a case where signals from positioning satellites according to GPS (GPS satellites) are received, a signal to be demodulated is formed with 25 repetitions (pages) of 30-second frame data formed with five six-second sub-frames. Of these sub-frames, the first sub-frame data (sub-frame 1) through third sub-frame data (sub-frame 3) of any desired page are acquired. In this manner, data related to the date and time information and the satellite orbit information necessary for location measurement are acquired. In three-dimensional location measurement, the satellite orbit information (satellite locations) and the date and time information (timing) about four satellites are necessary. In a case where there is no need to obtain information about the height direction, however, location measurement on the ground surface is assumed so that location measurement can be carried out with the satellite orbit information and the date and time information about three satellites (three is the necessary number in acquiring the information to be obtained).

However, depending on the arrangement (coordinates) of the positioning satellites to be used in location measurement (in a case where the positioning satellites to be used in location measurement are aligned on a line, for example), locations might not be determined with high precision in a three-dimensional space or in a two-dimensional plane on the ground surface. As the parameter indicating the positioning precision in accordance with such coordinates, DOP (Dilution of Precision, or P (Position) DOP in the case of four satellites, or H (Horizontal) DOP in the case of two-dimensional location measurement with three satellites) is calculated. Allowable precision is set as appropriate in accordance with products and purposes of use.

In the electronic clock 1 of this embodiment, the GPS reception processing unit 50 acquires the data of the sub-frames 1 through 3 from at least three positioning satellites, and carries out location measurement. If the value of the DOP related to this location measurement satisfies a predetermined condition (or is equal to or smaller than a predetermined reference value), the result of the location measurement is determined to be an accurate result.

FIG. 3 is a flowchart showing the control procedures to be carried out by the control unit 502c in a local time acquisition process to be performed by the GPS reception processing unit 50 of the electronic clock 1 of this embodiment.

This local time acquisition process is started when a predetermined input operation performed on the operating unit 47 by a user is detected, for example. Alternatively, the local time acquisition process may be started when a predetermined operation condition is satisfied.

When the local time acquisition process is started, the control unit 502c (module CPU) activates the RF unit 501 and the capturing unit 502a, and causes the RF unit 501 and the capturing unit 502a to start operations related to reception of radio waves in the L1 band and capture of signals from positioning satellites (step S101). At this point, the control unit 502c starts counting the elapsed time after the start of capture (capture elapsed time).

The control unit 502c determines whether the capture elapsed time has exceeded a predetermined capture time-out period (upper limit period) (step S102). If the control unit 502c determines that the capture elapsed time has not exceeded the capture time-out period ("NO" in step S102), the control unit 502c determines whether there is a newly captured signal from a positioning satellite (step S103). If the control unit 502c determines that there is a newly captured signal ("YES" in step S103), the control unit 502c causes the tracking unit 502b to start an operation to demodulate and decode a navigation message related to the captured positioning satellite, and causes the capturing unit 502a to end the capture of the signal (step S104).

The control unit 502c then determines whether the number of captured signals is equal to or larger than a predetermined number (step S106). This predetermined number is equal to or larger than the smallest number of necessary satellites (three satellites) in location measurement, and is a value that is set by taking into account a case where acquisition of a navigation message is unsuccessful after capture, or where a signal of a positioning satellite having undesirable coordinates is captured first. This predetermined number is normally set between four and eight, or five, for example. If the control unit 502c determines that the predetermined number or more of signals have been captured ("YES" in step S106), the control unit 502c causes the capturing unit 502a to end the capturing operation, and stops the capturing unit 502a (step S121). At this point, the control unit 502c starts counting the tracking elapsed time from the time when the capture is ended. If the control unit 502c determines that the predetermined number or more of signals have not been captured yet ("NO" in step S106), the process being performed by the control unit 502c moves on to step S112.

The control unit 502c then determines whether the tracking elapsed time has exceeded a predetermined tracking time-out period (step S122). If the control unit 502c determines that the tracking elapsed time has exceeded the tracking time-out period ("YES" in step S122), the process being performed by the control unit 502c moves on to step S133, and the control unit 502c ends the receiving operation, and ends the local time acquisition process. If the control unit 502c determines that the tracking elapsed time has not exceeded the tracking time-out period ("NO" in step S122), the control unit 502c determines whether the data of the sub-frames 1 through 3 in navigation messages have been acquired in the tracking unit 502b from three or more positioning satellites among the captured positioning satellites (step S123).

If the control unit 502c determines that the data of the sub-frames 1 through 3 have not been acquired yet from three or more positioning satellites ("NO" in step S123), the process being performed by the control unit 502c returns to step S122. If the control unit 502c determines that the data of the sub-frames 1 through 3 have been acquired ("YES" in step S123), the control unit 502c determines whether the acquired result of location measurement satisfies a predetermined precision condition (step S127). The control unit 502c determines whether the value of the DOP is equal to or smaller than the predetermined reference value. If the control unit 502c determines that the value of the DOP is equal to or smaller than the reference value, or that the precision of the result of location measurement is equal to or higher than a predetermined precision (or satisfies a predetermined criterion) ("YES" in step S127), the control unit 502c causes the tracking unit 502b to end the tracking operation, and stops the tracking unit 502b (step S128). The control unit 502c refers to the time-zone correspondence table 502d, and identifies a time zone based on acquired location information (step S129). At this point, the control unit 502c outputs the correct date and time, and time zone information to the CPU 41 at an appropriate time, so that the date and time on the timer circuit 46, and the local time to be displayed can be corrected. The control unit 502c then ends the local time acquisition process.

If the control unit 502c determines in the determination procedure in step S127 that the result of local measurement does not satisfy the precision condition ("NO" in step S127), the control unit 502c determines whether the data of the sub-frames 1 through 3 have been acquired from all the captured positioning satellites (step S131). If the control unit 502c determines that the data of the sub-frames 1 through 3 have not been acquired at all, or have not been acquired from one or more captured positioning satellites ("NO" in step S131), the process being performed by the control unit 502c moves on to step S122. If the control unit 502c determines that the data of the sub-frames 1 through 3 have been acquired from all the captured positioning satellites ("YES" in step S131), the control unit 502c ends the reception process related to all the positioning satellites (step S133), and ends the local time acquisition process.

If the control unit 502c determines in the procedure in step S103 that there are no new signals acquired during the capturing operation being performed by the capturing unit 502a ("NO" in step S103), the control unit 502c determines whether the number of currently captured positioning satellites (the number of captured positioning satellites) is "0" (step S111). If the control unit 502c determines that the number of captured positioning satellites is "0" ("YES" in step S111), the process being performed by the control unit 502c moves on to step S102. If the control unit 502c determines that the number of captured positioning satellites is not "0" ("NO" in step S111), the process being performed by the control unit 502c moves on to step S112.

After the process moves from step S111 or step S106 to step S112, the control unit 502c determines whether the data of the sub-frames 1 through 3 have been acquired from three or more positioning satellites among the positioning satellites acquired so far (step S112). If the control unit 502c determines that the data of the sub-frames 1 through 3 have not been acquired, or that the number of captured positioning satellites is smaller than three or the data of the sub-frames 1 through 3 have not been acquired ("NO" in step S112), the process being performed by the control unit 502c moves on to step S102.

If the control unit 502c determines in the determination procedure in step S112 that the data of the sub-frames 1 through 3 have been acquired from three or more positioning satellites ("YES" in step S112), the process being performed by the control unit 502c returns to step S127. At this point, the control unit 502c ends the capturing operation by the capturing unit 502a.

If the control unit 502c determines in the determination procedure in step S102 that the capture elapsed time has exceeded the capture time-out period without the number of captured positioning satellites becoming equal to or larger than the predetermined number ("YES" in step S102), the control unit 502c determines whether three or more positioning satellites have been captured (step S109). If the control unit 502c determines that three or more positioning satellites have been captured ("YES" in step S109), the process being performed by the control unit 502c moves on to step S121. If the control unit 502c determines that three or more positioning satellites have not been captured yet (or that only two or less positioning satellites have been captured) ("NO" in step S109), the process being performed by the control unit 502c moves on to step S133, ends the reception (the capture and the tracking), and ends the local time acquisition process.

First Modification

Next, a first modification of the local time acquisition process in the electronic clock 1 of this embodiment is described.

Figure 4:
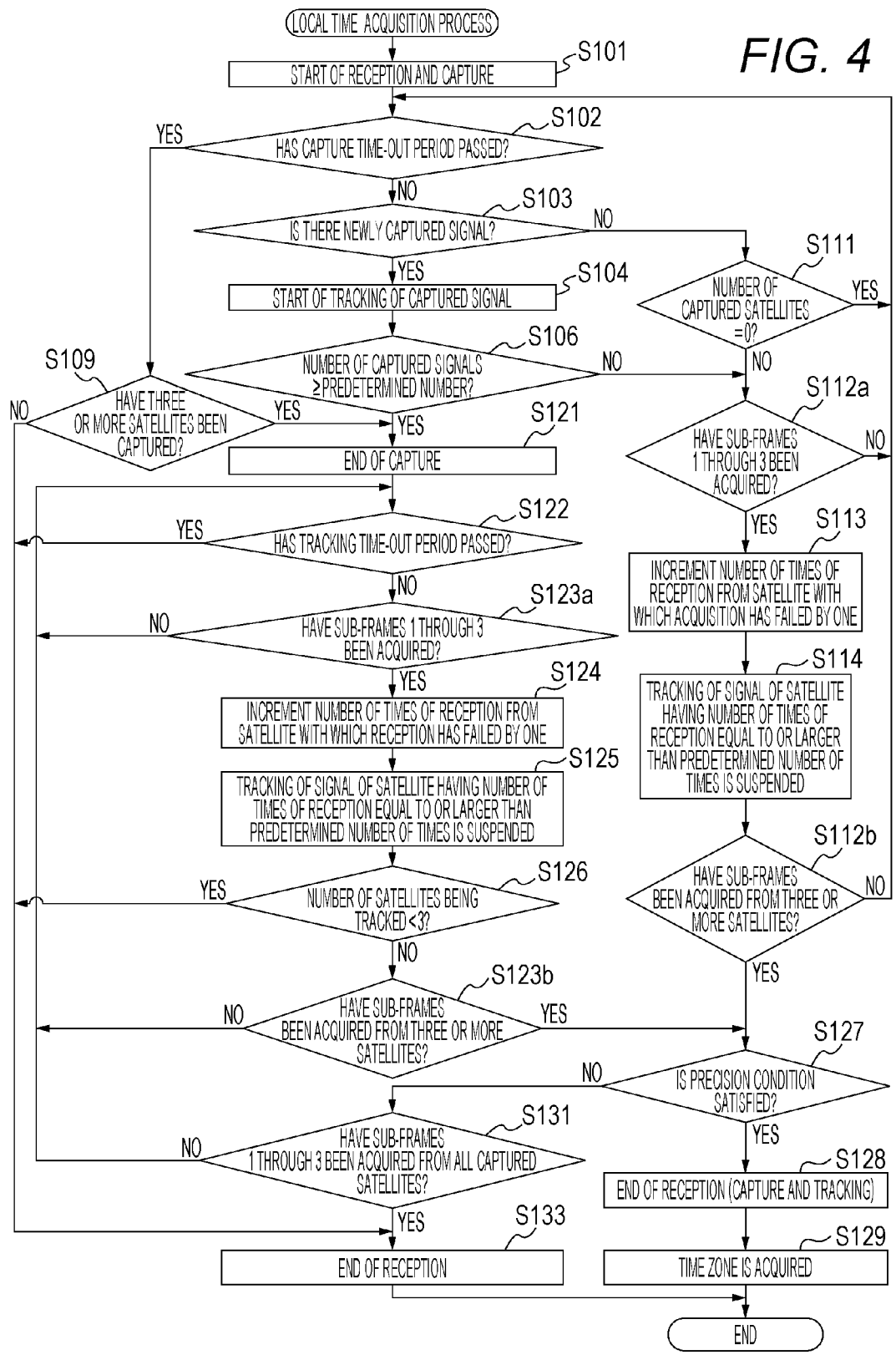
FIG. 4 is a flowchart showing the control procedures in a local time acquisition process according to a first modification.

FIG. 4 is a flowchart showing the control procedures to be carried out by the control unit 502c in a local time acquisition process according to the first modification.

In this local time acquisition process, the procedure in step S123 in the local time acquisition process of the above described embodiment is divided into steps S123a and S123b, the procedure in step S112 is divided into steps S112a and S112b, and further, the procedures in steps S124 through S126 and steps S113 and S114 are added. The procedures other than these procedures are the same as those of the above described embodiment, and are denoted by the same reference numerals as those used in the above described embodiment. Therefore, detailed explanation of them is not provided herein.

If the control unit 502c determines in the determination procedure in step S111 that the number of captured positioning satellites is not "0" ("NO" in step S111), the control unit 502c determines whether it is the time when the data of the sub-frames 1 through 3 have been acquired from each of the captured positioning satellites (step S112a). That is, after a location in a navigation message is identified in each of the positioning satellites (or after the process branches into "YES" in the previous procedure in step S112a), the control unit 502c determines whether all the reception periods for the sub-frames 1 through 3 have passed. The sequence of the reception periods is not necessarily equal to the order of the sub-frames 1, 2, and 3, and the sub-frame 1 or 2 in the next frame may be received after the sub-frame 3 is received, for example. That is, depending on the signal capture timing (the time to start acquiring data), the data of one frame (one cycle) may not start from the sub-frame 1.

If the control unit 502c determines that it is the time when the data of the sub-frames 1 through 3 have not been acquired from any of the captured satellites ("NO" in step S112a), the process being performed by the control unit 502c returns to step S102. If the control unit 502c determines that it is the time when all the data reception periods for the sub-frames 1 through 3 have passed in one of the satellites ("YES" in step S112a), the control unit 502c adds "1" to the number of times reception has been performed from the positioning satellite with which acquisition of the data of the sub-frames 1 through 3 has been unsuccessful among the positioning satellites that have reached the time (step S113) (the number of times reception has been performed is referred to as the "failure history", and the initial value of the number of times of reception is "0"). The control unit 502c also suspends the tracking operation for each positioning satellite with which the number of times of reception is a predetermined number of times (a predetermined upper limit number of times), or two or larger (or the reception level becomes equal to or lower than a reference level) (step S114).

The control unit 502c then determines whether the data of the sub-frames 1 through 3 have been acquired from signals related to three or more positioning satellites (or whether the number is equal to or larger than the necessary number for acquiring the information to be acquired) (step S112b). If the control unit 502c determines that the data of the sub-frames 1 through 3 have been acquired from three or more positioning satellites ("YES" in step S112b), the process being performed by the control unit 502c moves on to step S127. If the control unit 502c determines that the data of the sub-frames 1 through 3 have not been acquired from three or more positioning satellites, or that the number is smaller than the necessary number for location measurement ("NO" in step S112b), the process being performed by the control unit 502c returns to step S102.

If the control unit 502c determines in the determination procedure in step S122 that the tracking elapsed time has not exceeded the tracking time-out period ("NO" in step S122), the control unit 502c determines whether it is the time when the data of the sub-frames 1 through 3 have been acquired from each of the captured positioning satellites (step S123a). After a location in a navigation message is identified in a signal from each positioning satellite, the control unit 502c determines whether all the reception periods for the sub-frames 1 through 3 have passed.

If the control unit 502c determines that it is the time when the data of the sub-frames 1 through 3 have not been acquired from any of the captured satellites ("NO" in step S123a), the process being performed by the control unit 502c returns to step S122. If the control unit 502c determines that it is the time when the date of the sub-frames 1 through 3 have been acquired from one of the satellites ("YES" in step S123a), the control unit 502c adds "1" to the number of times reception has been performed from the positioning satellite with which acquisition of the data of the sub-frames 1 through 3 has been unsuccessful among the positioning satellites that have reached the time (step S124) (the initial value of the number of times of reception is "0"). The control unit 502c also suspends the tracking operation for each positioning satellite with which the number of times of reception is a predetermined number of times, or two or larger (step S125).

Later in the determination procedure in step S131, "all the captured satellites" do not include the positioning satellites for which the tracking operation has been suspended in the procedures in steps S114 and S125 (or those positioning satellites are regarded as not having been captured in the first place).

The control unit 502c then determines whether the number of positioning satellites being currently tracked is smaller than three (step S126). If the control unit 502c determines that the number of positioning satellites being currently tracked is smaller than three ("YES" in step S126), the process being performed by the control unit 502c moves on to step S133, and the control unit 502c ends the receiving operation (step S133), and ends the local time acquisition process.

If the control unit 502c determines that the number of positioning satellites being currently tracked is not smaller than three (is three or larger) ("NO" in step S126), the control unit 502c determines whether the data of the sub-frames 1 through 3 have been acquired from three or more positioning satellites (step S123b). If the control unit 502c determines that the data of the sub-frames 1 through 3 have been acquired from three or more positioning satellites ("YES" in step S123b), the process being performed by the control unit 502c moves on to step S127. If the control unit 502c determines that the data of the sub-frames 1 through 3 have not been acquired from three or more positioning satellites ("NO" in step S123b), the process being performed by the control unit 502c returns to step S122.

Second Modification

Figure 5:
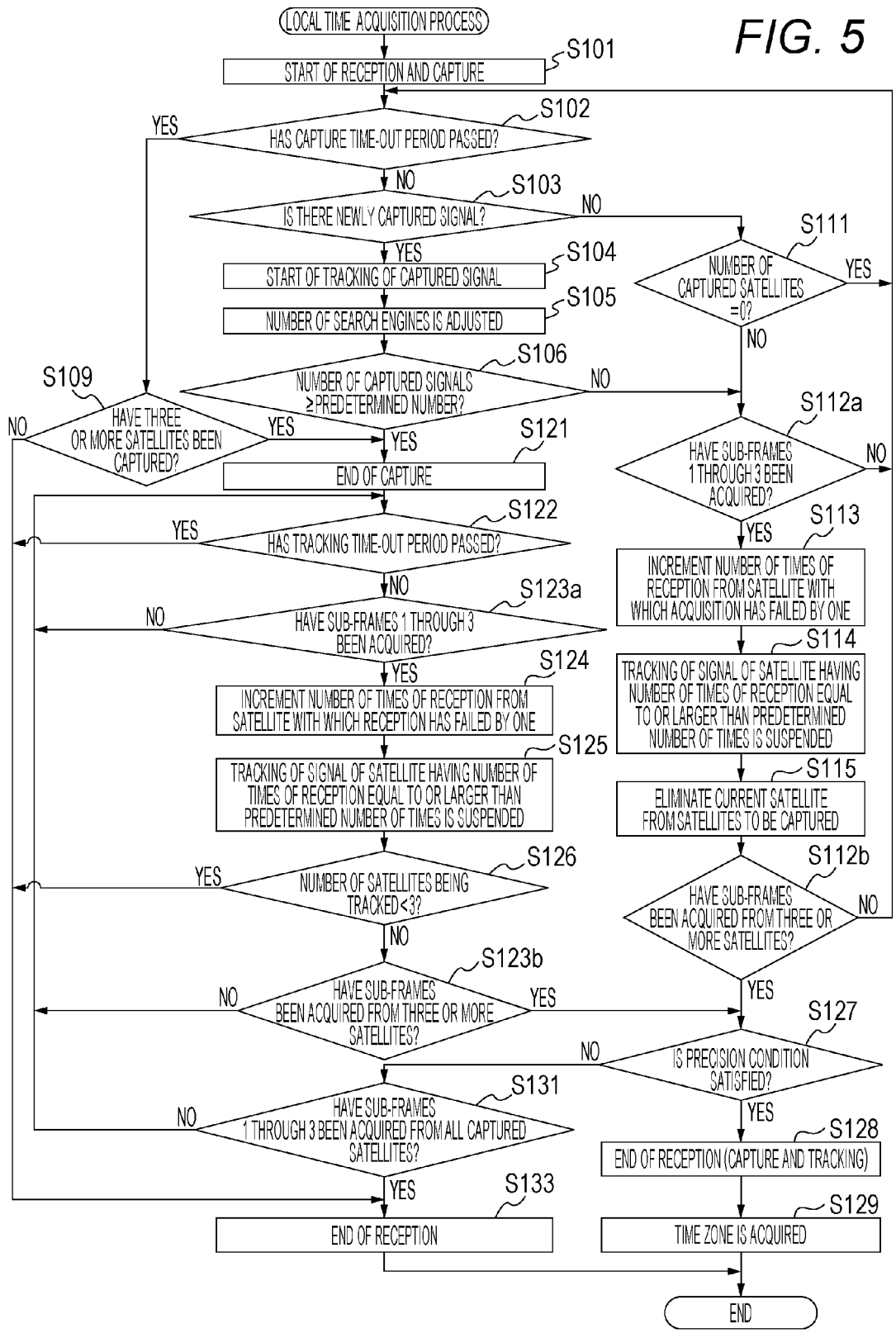
FIG. 5 is a flowchart showing the control procedures in a local time acquisition process according to a second modification.

FIG. 5 is a flowchart showing the control procedures to be carried out by the control unit 502c in a second modification of the local time acquisition process.

In the second modification of the local time acquisition process, the procedures in steps S106 and 115 are further added to the local time acquisition process of the above described first modification. The details and procedures of the process other than these procedures are the same as those of the first modification, and are denoted by the same reference numerals as those used in the first modification. Therefore, detailed explanation of them is not provided herein.

When the tracking unit 502b is made to start an operation to track a newly captured signal in the procedure in step S104, the control unit 502c adjusts the number of search engines to be operated, in accordance with the number of satellites to be captured that decreases as signals related to the positioning satellites to be tracked are excluded from the signals to be captured by the capturing unit 502a (step S105). For example, in a case where the capturing unit 502a includes 16 search engines and is to capture 32 GPS satellites, the capturing unit 502a performs a process of capturing signals of the 32 GPS satellites by alternately searching 16 GPS satellites and the other 16 GPS satellites of the 32 GPS satellites. In a case where two GSP satellites are captured, the control unit 502c can stop one of the search engines, and change the setting so that the remaining 15 search engines alternately search 15 GPS satellites and the other 15 GPS satellites for signals of the remaining 30 GPS satellites. The process being performed by the control unit 502c then moves on to step S106.

Also, after suspending the data acquisition from signals of a positioning satellite having a number of times of reception equal to or larger than the predetermined number of times in the procedure in step S114, the control unit 502c excludes the positioning satellite from the positioning satellites to be captured by the capturing unit 502a (step S115). That is, after acquisition of the data of the sub-frames 1 through 3 is unsuccessful, and the tracking operation is suspended, the signals of once-captured positioning satellites are not searched for again. The process being performed by the control unit 502c then moves on to step S112b.

As described above, the electronic clock 1 of the first embodiment includes: the capturing unit 502a that searches for and captures signals from positioning satellites included in radio waves; the tracking unit 502b that demodulates and decodes the captured signals, and acquires the sub-frames 1 through 3 necessary for location measurement among the data transmitted from the positioning satellites; and the control unit 502c. The control unit 502c acquires the current location, using the data of the sub-frames 1 through 3 acquired by the tracking unit 502b (the control unit 502c serving as an information acquiring unit). The control unit 502c holds the failure history related to acquisition of the data of the sub-frames 1 through 3 for each signal, and causes the tracking unit 502b to suspend the acquisition of the data of the sub-frames 1 through 3 from signals at reception levels equal to or lower than a predetermined reference level based on the failure history. In a case where the number of signals from which the data of the sub-frames 1 through 3 are to be acquired becomes smaller than three due to the above mentioned suspension after the capturing unit 502a is made to end signal search under a predetermined condition, the control unit 502c causes the GPS reception processing unit 50 to end the reception operation (the control unit 502c serving as a reception control unit).

That is, if a tracking time-out period is simply set in an operation to be performed by the tracking unit 502b, the operation is continued until the tracking time-out period has passed, regardless of variations in timing of capture. In this electronic clock 1, on the other hand, whether reception of the sub-frames 1 through 3 is difficult is determined with respect to each positioning satellite. Accordingly, it is possible to impartially determine whether the sub-frames 1 through 3 can be sufficiently acquired within the tracking time-out period with respect to the signal of each positioning satellite in accordance with the variations in timing of capture, or it is possible to determine whether location measurement can be carried out within the tracking time-out period. Meanwhile, any restrictions as to the possibility of use in location measurement depending on the intensity or the S/N ratio or the like of received signals are not set on signals that can be captured, and the possibility of the above described acquisition is determined after acquisition of the data of the sub-frames 1 through 3 is tried once. For example, in a case where the signal intensity is not sufficiently high, but the data of the sub-frames 1 through 3 can be acquired in a short time in accordance with the timing of burst noise contamination or the timing of attenuation of the reception intensity due to phasing, the acquired data can be effectively used. If location measurement is determined to be difficult through the above determination process, the receiving operation is ended more promptly. If reception is continued, the possibility of successful reception can be increased.

Accordingly, information from positioning satellites can be acquired more efficiently than in conventional cases.

In a case where the precision of the acquired current location does not satisfy a predetermined condition, the control unit 502c determines whether any signal other than the signals related to the data of the sub-frames 1 through 3 used in the location measurement has been captured. In a case where the capturing operation has not been ended, or where it is determined that a signal other than the signals used in the location measurement has been captured, the tracking unit 502b is made to continue the acquisition of the data related to the captured signal. In a case where the capturing operation has been ended, and it is determined that the data of the sub-frames 1 through 3 acquired from all the captured signals have been used in the location measurement, the GPS reception processing unit 50 is made to suspend the operation to receive radio waves from positioning satellites.

That is, in a case where there is a signal captured after the other signals, or where there is a signal from which the data of the sub-frames 1 through 3 has not been acquired at substantially the same time as the other signals due to temporary noise, there is a possibility that the precision of the location information can be increased, as the positioning satellite related to the signal is added, and the coordinates of the positioning satellites are changed. In a case where the necessary precision cannot be obtained even though all the data of the sub-frames 1 through 3 obtained from captured signals are used, on the other hand, a change in the coordinates due to movement of the positioning satellites related to the captured signals cannot be expected in a short period of time. Also, with only a single location measuring operation, there is a high possibility of unsuccessful reception due to movement during the operation. Since movement during an operation is normally not recommended, there is a low possibility that a signal from a new positioning satellite can be captured in a short period of time as the point of reception moves. Therefore, even if a location measuring operation is repeated, an increase in precision can hardly be expected. Therefore, an operation with a low possibility of location measurement with a desired precision or higher is promptly ended, so that the possibility of unnecessary consumption of power and time can be lowered.

The control unit 502c also counts the number of times acquisition of the data of the sub-frames 1 through 3 has been unsuccessful in the tracking unit 502b with respect to each captured signal, and suspends the acquisition of the data of the sub-frames 1 through 3 with respect to the signals with which the number of unsuccessful acquisition times is equal to or larger than a predetermined number of times. That is, reception of signals from positioning satellites at low reception levels is promptly suspended without waste of time, so that location measurement can be carried out only with signals from positioning satellites from which the data of the sub-frames 1 through 3 are expected to be acquired. Particularly, signals that are likely to become temporarily difficult to be received due to noise or phasing, in spite of the signal intensity to be received, are accurately identified and used or eliminated. In this manner, location measurement can be carried out quickly without fail.

The control unit 502c does not cause the capturing unit 502a to re-search for signals with which acquisition of the data of the sub-frames 1 through 3 has been suspended. As described above, any change is expected in a short time in a situation where acquisition of the sub-frames 1 through 3 is difficult. Therefore, capture and tracking of such signals are not repeated many times, so that unnecessary consumption of time and power can be prevented.

In a case where the number of signals captured by the capturing unit 502a is equal to or larger than the predetermined number of signals necessary in location measurement, the signal search is ended. In a case where the sub-frames 1 through 3 are acquired from three or more positioning satellites before the predetermined number of signals are captured, the control unit 502c performs control so that location measurement is carried out with the data of the acquired sub-frames 1 through 3.

That is, in conventional cases, data is acquired by capturing signals from a sufficiently larger number of positioning satellites than the number of necessary satellites in location measurement, so that location measurement is carried out with high precision without fail. In a case where signals from the sufficiently larger number of positioning satellites are not captured, on the other hand, if location measurement is possible, the location measurement is carried out once, and whether the current location data related to the location measurement can be used is determined based on the precision of the location measurement. If there is a possibility of successful location in that case, the location measurement is carried out. Accordingly, in a case where the current location can be acquired with the necessary precision before the predetermined number of positioning satellites to be used in location measurement are captured and the data of the sub-frames 1 through 3 are acquired, the reception process can be ended while the current location is quickly acquired.

In a case where the capture time-out period has passed since the capturing unit 502a started searching signals from positioning satellites, the search is ended. If signals from three or more positioning satellites necessary for location measurement have been captured before the end of the search, the tracking unit 502b is made to acquire the data of the sub-frames 1 through 3 from the captured signals.

Accordingly, even if the desired number of positioning satellites to be used in conventional location measurement have not been acquired, the possibility of successful location data acquisition can be increased by carrying out location measurement, as long as signals from three or more positioning satellites necessary for location measurement have been acquired.

The capturing unit 502a has more than one channel, searches for signals from positioning satellites in parallel through the channels, excludes captured signals from the signals to be captured, and adjusts the number of channels to be used in searching for the signals to be captured, in accordance with the number of the remaining signals to be captured.

Accordingly, electric power is not wasted by unnecessarily turning on a channel even though the number of signals to be searched for has decreased. Thus, a signal capturing operation can be efficiently performed.

Second Embodiment

Next, an electronic clock according to a second embodiment is described.

Figure 6:
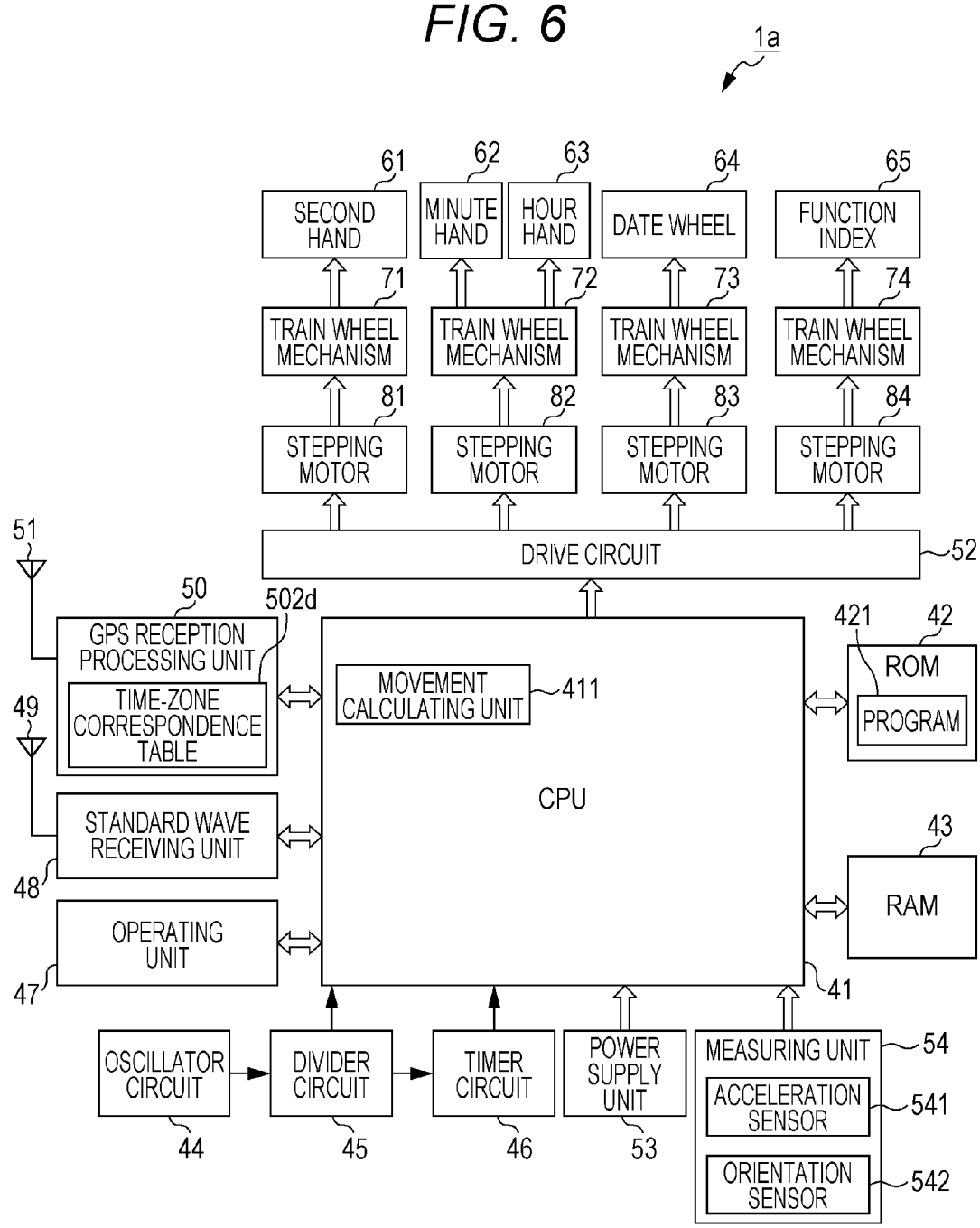
FIG. 6 is a block diagram showing the functional structure of an electronic clock according to a second embodiment.

FIG. 6 is a block diagram showing the functional structure of an electronic clock 1a according to the second embodiment.

This electronic clock 1a differs from the electronic clock 1 of the first embodiment only in that a measuring unit 54 is added. The other components of this embodiment are denoted by the same reference numerals as those used in the first embodiment, and explanation of them is not provided herein.

The measuring unit 54 is designed to measure the posture, the state of motion, and the like of the electronic clock 1a. The measuring unit 54 includes an acceleration sensor 541 and an orientation sensor 542.

The acceleration sensor 541 is a triaxial sensor for measuring the state of motion of the electronic clock 1a, and, for example, measures the accelerations in two axial directions on the display surface (the plane of rotation of the indexes 61 through 65) of the electronic clock 1a, and in a direction perpendicular to the display surface. The acceleration sensor 541 may be a sensor using piezoresistance, for example.

The orientation sensor 542 is a sensor for measuring the posture (orientation) of the electronic clock 1a, and measures the orientation of magnetic north. The orientation sensor 542 may be a sensor using a magnetoresistive element (MR element), for example.

A determination program for determining the state of motion of the electronic clock 1a is stored in the ROM 42, and the CPU 41 (a movement calculating unit 411) can determine the state of motion of the electronic clock 1a by executing the determination program. For example, the direction perpendicular to the ground surface (or the vertical direction) is identified from the gravitational acceleration measured by the acceleration sensor 541. Accordingly, the state of motion and movement of a user can be determined from a change in acceleration in the vertical direction, a change in acceleration in a horizontal plane, the direction of movement in the horizontal plane measured by the orientation sensor 542, and the like. In the case of motion that involves movement mainly in a horizontal direction caused by an automobile or a vehicle, the velocity in the horizontal direction and the movement (a location change) can be calculated (or roughly calculated) based on a change in the horizontal acceleration. In the case of motion that involves cyclic changes in acceleration in the vertical direction due to walking or the like, and cyclic changes in acceleration mainly in the display surface of the clock due to swinging of the arms, the number of steps walked by the wearer of the electronic clock $1a$ in accordance with the cycles of changes in the accelerator is counted, and movement can be calculated based on the average length of stride and the movement direction measured by the orientation sensor $542$. As an acceleration change pattern in the vertical direction and in the arm swinging plane related to determination of a walking state, a conventionally-known pattern can be used.

Next, a location measuring operation in the electronic clock $1a$ of this embodiment is described.

In the electronic clock $1a$ of this embodiment, movement is measured based on the above described measurement carried out by the measuring unit $54$ during a location measuring operation. Even if location measurement after the end of a capturing operation is not successful, location measurement is carried out again, as long as movement of the wearer of the electronic clock $1a$ is detected or a change in the point of location measurement is detected.

Figure 7:
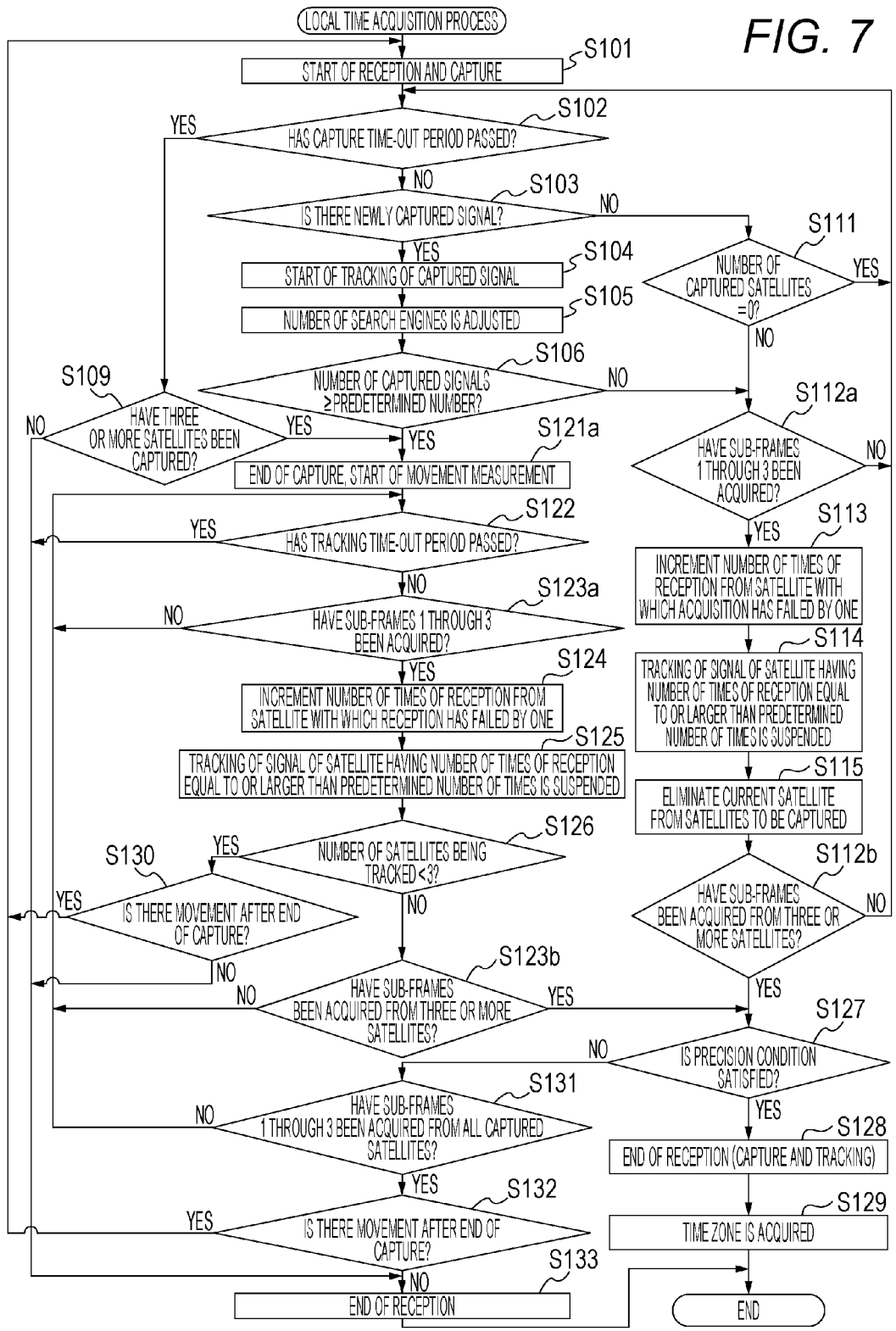
FIG. 7 is a flowchart showing the control procedures in a local time acquisition process to be performed by the GPS reception processing unit of the electronic clock according to the second embodiment.

FIG. 7 is a flowchart showing the control procedures to be carried out by the CPU $41$ in a local time acquisition process to be performed by the GPS reception processing unit $50$ of the electronic clock $1a$ of this embodiment.

This local time acquisition process differs from the local time acquisition process of the second modification in the electronic clock $1$ of the above described first embodiment, in that the procedure in step S121 is replaced with the procedure in step S121a, and the procedures in steps S130 and S132 are added. The same procedures as those of the first embodiment are denoted by the same reference numerals as those used in the first embodiment, and detailed explanation of them is not provided herein.

When the process branches into "YES" as a result of the determination procedure in step S106 or S109, the control unit $502c$ ends the operation to capture signals from positioning satellites, and transmits a control signal to the CPU $41$ and controls the CPU $41$ to calculate the movement after the time based on the measurement data obtained by the measuring unit $54$ (step S121a).

If the control unit $502c$ determines in the determination procedure in step S126 that the number of positioning satellites being tracked is smaller than three ("YES" in step S126), the control unit $502c$ determines whether the location of the electronic clock $1a$ has moved since the capturing operation was ended in step S121 (step S130). Specifically, the control unit $502c$ acquires the relative travel distance from the location of the end of the capturing operation, the relative travel distance having being measured by the measuring unit $54$ and calculated by the CPU $41$. The control unit $502c$ then determines whether the relative travel distance is equal to or longer than a predetermined distance (reference distance). If the control unit $502c$ determines that the relative travel distance is equal to or longer than the predetermined distance ("YES" in step S130), the process being performed by the control unit $502c$ returns to step S101, and the capturing operation is started again. If the control unit $502c$ determines that the relative travel distance is neither equal to nor longer than the predetermined distance ("NO" in step S130), the process being performed by the control unit $502c$ moves on to step S133, and the control unit $502c$ ends the receiving operation (step S133).

If the process branches into "YES" as a result of the procedure in step S131, the control unit $502c$ determines whether the location of the electronic clock $1a$ has moved after the procedure in step S121a (step S132). If the control unit $502c$ determines that the location of the electronic clock $1a$ has moved ("YES" in step S132), the process being performed by the control unit $502c$ moves on to step S101. If the control unit $502c$ determines that the location of the electronic clock $1a$ has not moved ("NO" in step S132), the process being performed by the control unit $502c$ moves on to step S133.

As described above, the electronic clock $1a$ of the second embodiment includes the measuring unit $54$ that measures a state of motion, and the CPU $41$ (or the movement calculating unit) calculates movement of the location based on measurement data obtained by the measuring unit $54$, and causes the capturing unit $502a$ to suspend the signal search under a predetermined condition. If the distance from the location of the suspension of the search to the location where acquisition of the current location has failed is equal to or longer than the predetermined reference distance, the capturing unit $502a$ is made to resume the signal search.

The signal search and the data acquisition period are not simply prolonged, but the search and the capture are resumed to continue the receiving operation only when there is a possibility that the point of reception of radio waves has moved, and the reception environments have changed, even though reception has failed once. Accordingly, the possibility of successful acquisition of the current location can be efficiently increased.

It should be noted that the present invention is not limited to the above described embodiments, and various modifications may be made to them.

For example, in the above described embodiments, location measurement is carried out even if signals from only three positioning satellites have been received in a local time acquisition process. In a conventional location measurement process, however, altitude information is also required, and therefore, current location information may be calculated and output only if signals from four or more positioning satellites have been received.

Also, in the above described embodiments, the data of the sub-frames $1$ through $3$ are received from GPS satellites. In a case where data is to be received from positioning satellites of a different kind, however, the necessary data range needs to be acquired in accordance with the format of navigation messages of the positioning satellites. Time-out periods related to capture and tracking may also be set in accordance with the format.

Also, in the above described embodiments, the number of times reception of the data of the sub-frames $1$ through $3$ required for GPS location measurement has failed is simply counted, and, when the number of times reception has failed becomes larger than a predetermined number of times, the acquisition (tracking) of data from the signal is suspended. However, in a case where the number of times the data of the sub-frames $1$ through $3$ have been received greatly differs between a signal captured early and a signal captured later, the tracking may be suspended not when the number of times reception has failed becomes larger than the predetermined number of times, but when the failure frequency or the rate of reception failure after the second reception exceeds 50%.

Also, in the above described embodiments, the top of the data of one cycle is not necessarily a sub-frame $1$. However, all the tops of data may be sub-frames $1$, and the current location may be calculated only if the date is received substantially at the same time within a transmission delay range based on the distances from respective positioning satellites.

During a location measurement process (a local time acquisition process), the current location may be calculated using the data of different frames among positioning satellites. Even in a case where the number of times reception of the sub-frames 1 through 3 has failed reaches a predetermined number of times, the data of the sub-frames 1 through 3 can be used in location measurement, if all the necessary data of the sub-frames 1 through 3 have been acquired from different frames before the number of times reception has failed reaches the predetermined number of times. After that, if the current location is calculated again due to inadequate precision, the data of the sub-frames 1 through 3 acquired from the signals of which tracking has been suspended may not be used.

Also, in the above described embodiments, after the reception period for the data of the sub-frames 1 through 3 has passed, whether some of the received data of the sub-frames 1 through 3 has not been acquired is collectively determined, and the number of times of reception is incremented by "1" before the next cycle of reception is conducted. However, failure may be detected in real time, and, if failure is detected more than once in one cycle, the number of times of reception may not be incremented after the second reception. Alternatively, when the number of times of reception becomes one short of a predetermined number of times, failure detection with respect to the signal may be switched to real-time detection. When unsuccessful acquisition of the data of the sub-frames 1 through 3 is detected, the tracking of the signal may be promptly suspended.

Also, in the above described embodiments, an ephemeris is obtained so as to acquire current location information through location measurement. However, in a case where the precision of location measurement may be low, a location can be roughly calculated with an almanac. Therefore, in a case where the almanac data of the positioning satellite being captured can be received by some positioning satellite, the almanac data may be used.

Also, in the above described embodiments, DOP is used as an index of precision. However, the index of precision is not necessarily DOP. For example, inadequate precision may be detected when the value of a calculated velocity or altitude is outside a range defined by reference values that indicate the upper limit value and the lower limit value of velocities or altitudes.

Also, in the above described embodiments, a single precision condition is set. However, the precision condition for positions acquired during a capturing operation or positions acquired without the use of all the captured signals may be stricter than the precision condition for positions acquired after the end of capture or positions acquired with the use of all the captured signals.

In this case, if the precision condition is determined not to be satisfied after the data of the sub-frames 1 through 3 have been acquired from three or more satellites through the determination procedure in step S112 or S112*b* and the process has moved to step S127, the process may not move on to step S131, but may return to the procedure in step S102.

In the second embodiment, the acceleration sensor 541 and the orientation sensor 542 determine a state of motion and measure a travel distance. However, some other sensors, such as a horizontal sensor on the display surface of the electronic clock 1*a*, may be used, for example.

Also, in the second embodiment, whether to allow resumption of search is determined based on the relative travel distance at the time of the end of capture. However, in a case where it is difficult to accurately determine the direction of motion and accumulate motion vector quantities, only the accumulated value of movement (scalar) may be simply set as the reference (reference distance) for determination. In this case, the relative travel distance may be short as a result of a series of movements or a return to the original point. However, if there is a cause of attenuation of radio waves transmitted from satellites, such as when a shutter or some special-purpose window of a room is left open before the user returns to the room, the reception environment can be improved.

In the above described first through third modifications and the above described second embodiment, components and procedures are added to the components and the processing procedures of the first embodiment. However, these added components and procedures may be used independently of one another or may be combined as appropriate. For example, in the local time acquisition process of the first modification, the procedure of step S131 may not be added, and, when the process branches into "NO" as a result of the determination procedure in step 5127, the process may return directly to the procedure in step S122.

Other than the above, any appropriate changes can be made to the specific structures, and the contents and the procedures of the processes of the above described embodiments, without departing from the scope of the present invention.

Although embodiments of the present invention have been described so far, the scope of the present invention is not limited to the above described embodiments, and includes the inventions disclosed in the claims and equivalents thereof.

The invention claimed is:

1. A radio controlled timepiece that receives radio waves transmitted from a positioning satellite,
the radio controlled timepiece comprising
a GPS reception processing unit configured to
search for and capture a signal from a positioning satellite, the signal being included in received radio waves,
demodulate and decode the captured signal, to acquire data corresponding to acquisition target information in data transmitted from the positioning satellite,
acquire the acquisition target information, using the acquired data,
hold a failure history related to acquisition of the data with respect to each captured signal,
suspend acquisition of the data from a signal having a reception level determined to be at least equal to a predetermined reference level based on the failure history, and
end acquisition of the data when the number of signals from which the data is to be acquired after search for the signal is ended under a predetermined condition becomes smaller than the number of signals necessary in acquiring the acquisition target information.

2. The radio controlled timepiece according to claim 1, wherein,
when precision of the acquired acquisition target information does not satisfy a predetermined criterion, the GPS reception processing unit determines whether a signal other than the signal related to the data used in acquiring the acquisition target information has been captured,
when search for the signal has not been ended, or when the GPS reception processing unit determines that a signal other than the signal used in acquiring the acquisition target information has been captured, the GPS reception processing unit continues to acquire the data, and,
when search for the signal has been ended, and the GPS reception processing unit determines that the data acquired from all captures signals have been used in acquiring the acquisition target information, the GPS reception processing unit ends the acquisition of the data.

3. The radio controlled timepiece according to claim 1, wherein the GPS reception processing unit counts the number of times acquisition of the data has failed as the failure history, and suspends acquisition of the data from the signals with which the number of times acquisition of the data has failed is at least equal to a predetermined upper limit value.

4. The radio controlled timepiece according to claim 2, wherein the GPS reception processing unit counts the number of times acquisition of the data has failed as the failure history, and suspends acquisition of the data from the signals with which the number of times acquisition of the data has failed is at least equal to a predetermined upper limit value.

5. The radio controlled timepiece according to claim 1, wherein the GPS reception processing unit does not re-search for a signal with which acquisition of the data has been suspended.

6. The radio controlled timepiece according to claim 2, wherein the GPS reception processing unit does not re-search for a signal with which acquisition of the data has been suspended.

7. The radio controlled timepiece according to claim 3, wherein the GPS reception processing unit does not re-search for a signal with which acquisition of the data has been suspended.

8. The radio controlled timepiece according to claim 4, wherein the GPS reception processing unit does not re-search for a signal with which acquisition of the data has been suspended.

9. The radio controlled timepiece according to claim 1, wherein,
when a predetermined number of signals have been captured, the GPS reception processing unit ends search for the signal, the predetermined number being at least equal to the number of signals necessary in acquiring the acquisition target information, and,
when the data has been acquired from at least the same number of signals as the number of the signals necessary in acquiring the acquisition target information before the predetermined number of signals are captured, the GPS reception processing unit acquires the acquisition target information using the data.

10. The radio controlled timepiece according to claim 2, wherein,
when a predetermined number of signals have been captured, the GPS reception processing unit ends search for the signal, the predetermined number being at least equal to the number of signals necessary in acquiring the acquisition target information, and,
when the data has been acquired from at least the same number of signals as the number of the signals necessary in acquiring the acquisition target information before the predetermined number of signals are captured, the GPS reception processing unit acquires the acquisition target information using the data.

11. The radio controlled timepiece according to claim 3, wherein,
when a predetermined number of signals have been captured, the GPS reception processing unit ends search for the signal, the predetermined number being at least equal to the number of signals necessary in acquiring the acquisition target information, and,
when the data has been acquired from at least the same number of signals as the number of the signals necessary in acquiring the acquisition target information before the predetermined number of signals are captured, the GPS reception processing unit acquires the acquisition target information using the data.

12. The radio controlled timepiece according to claim 4, wherein,
when a predetermined number of signals have been captured, the GPS reception processing unit ends search for the signal, the predetermined number being at least equal to the number of signals necessary in acquiring the acquisition target information, and,
when the data has been acquired from at least the same number of signals as the number of the signals necessary in acquiring the acquisition target information before the predetermined number of signals are captured, the GPS reception processing unit acquires the acquisition target information using the data.

13. The radio controlled timepiece according to claim 5, wherein,
when a predetermined number of signals have been captured, the GPS reception processing unit ends search for the signal, the predetermined number being at least equal to the number of signals necessary in acquiring the acquisition target information, and,
when the data has been acquired from at least the same number of signals as the number of the signals necessary in acquiring the acquisition target information before the predetermined number of signals are captured, the GPS reception processing unit acquires the acquisition target information using the data.

14. The radio controlled timepiece according to claim 6, wherein,
when a predetermined number of signals have been captured, the GPS reception processing unit ends the search for the signal, the predetermined number being at least equal to the number of signals necessary in acquiring the acquisition target information, and,
when the data has been acquired from at least the same number of signals as the number of the signals necessary in acquiring the acquisition target information before the predetermined number of signals are captured, the GPS reception processing unit acquires the acquisition target information using the data.

15. The radio controlled timepiece according to claim 7, wherein,
when a predetermined number of signals have been captured, the GPS reception processing unit ends search for the signal, the predetermined number being at least equal to the number of signals necessary in acquiring the acquisition target information, and,
when the data has been acquired from at least the same number of signals as the number of the signals necessary in acquiring the acquisition target information before the predetermined number of signals are captured, the GPS reception processing unit acquires the acquisition target information using the data.

16. The radio controlled timepiece according to claim 8, wherein,
when a predetermined number of signals have been captured, the GPS reception processing unit ends search for the signal, the predetermined number being at least equal to the number of signals necessary in acquiring the acquisition target information, and,
when the data has been acquired from at least the same number of signals as the number of the signals necessary in acquiring the acquisition target information before the predetermined number of signals are captured, the GPS reception processing unit acquires the acquisition target information using the data.

17. The radio controlled timepiece according to claim 1, wherein,
when a predetermined upper limit time has passed since a start of search for the signal, the GPS reception processing unit ends the search, and,
when at least the same number of signals as the number of signals necessary in acquiring the acquisition target information have been captured before the end of the search, the GPS reception processing unit acquires the data from the captured signals.

18. The radio controlled timepiece according to claim 2, wherein,
when a predetermined upper limit time has passed since a start of search for the signal, the GPS reception processing unit ends the search, and,
when at least the same number of signals as the number of signals necessary in acquiring the acquisition target information have been captured before the end of the search, the GPS reception processing unit acquires the data from the captured signals.

19. The radio controlled timepiece according to claim 1, wherein the GPS reception processing unit searches for signals from a plurality of positioning satellites, excludes each captured signal from capture target signals, and adjusts the number of the capture target signals in accordance with the number of remaining capture target signals.

20. The radio controlled timepiece according to claim 1, further comprising:
a measuring unit configured to measure a state of motion; and
a clock control unit configured to calculate a location change based on measurement data obtained by the measuring unit,
wherein, after suspending search for the signal under the predetermined condition, the GPS reception processing unit resumes the search when the location change from a location of the suspension of the search to a location of failure of acquisition of the acquisition target information is at least equal to a predetermined reference distance.

* * * * *